United States Patent [19]

Gibbemeyer

[11] Patent Number: 4,678,425

[45] Date of Patent: Jul. 7, 1987

[54] RESILIENT SKIRTED SPINDLE NOSE AND PALLET WITH RECIPROCATABLE SPINDLE COMBINED THEREWITH

[75] Inventor: Joseph F. Gibbemeyer, Cincinnati, Ohio

[73] Assignee: Cincinnati Milacron Inc., Cincinnati, Ohio

[21] Appl. No.: 900,947

[22] Filed: Aug. 27, 1986

[51] Int. Cl.$^4$ .............................................. B29C 49/28
[52] U.S. Cl. .............................. 425/522; 198/803.12; 198/803.8; 264/523; 264/535; 264/543; 294/98.1; 425/525; 425/526; 425/534; 425/535
[58] Field of Search ............... 264/523, 538, 543, 535; 425/522, 525, 534, 535, 538, 526; 198/803.12, 803.8; 294/98.1

[56] References Cited

U.S. PATENT DOCUMENTS 4,185,812  1/1980  Hall ....................................... 198/345
4,382,760  5/1983  Wiatt et al. ........................... 425/534
4,456,447  6/1984  Smith .................................... 425/534

Primary Examiner—Jay H. Woo
Assistant Examiner—Timothy W. Heitbrink
Attorney, Agent, or Firm—Daniel P. Worth

[57] ABSTRACT

A pallet has a plurality of reciprocable spindles mounted thereon. Each spindle can be reciprocated and has an improved bearing support and bias means urging the spindle to one end of its reciprocation path. An improved spindle nose is provided to mount on the spindle as an exchangeable chuck thereby changing the size of the workpiece that can be handled. The spindle nose features an improved means to maintain seal with the preform finish that includes a base from which protrudes a flexible skirt which is extending from the other side of said base, said skirt being sufficiently resilient to maintain sealing engagement with the inside diameter of the preform finish during blow molding; and an air passage extending completely through said locating stud, base, and skirt region.

19 Claims, 6 Drawing Figures

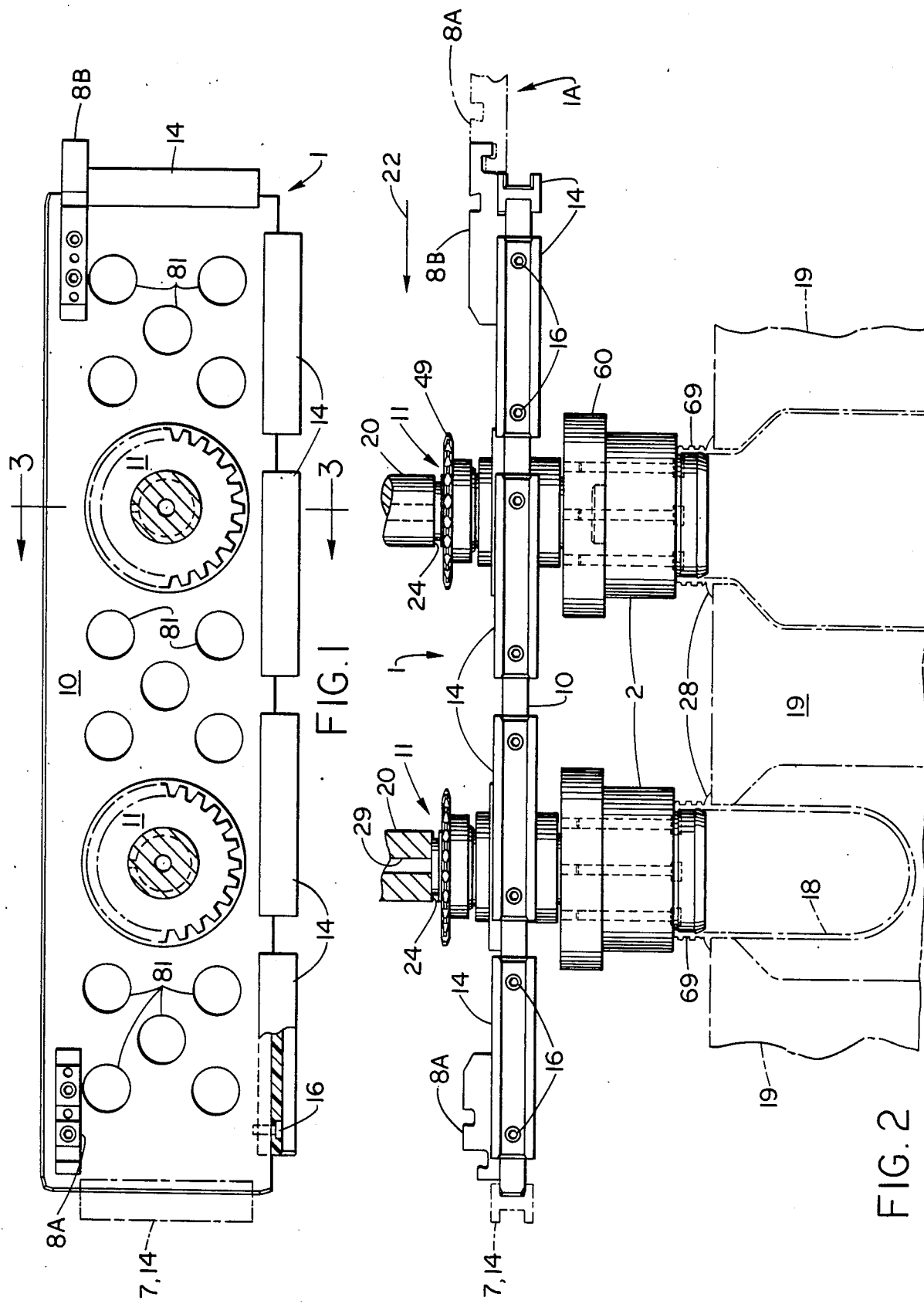

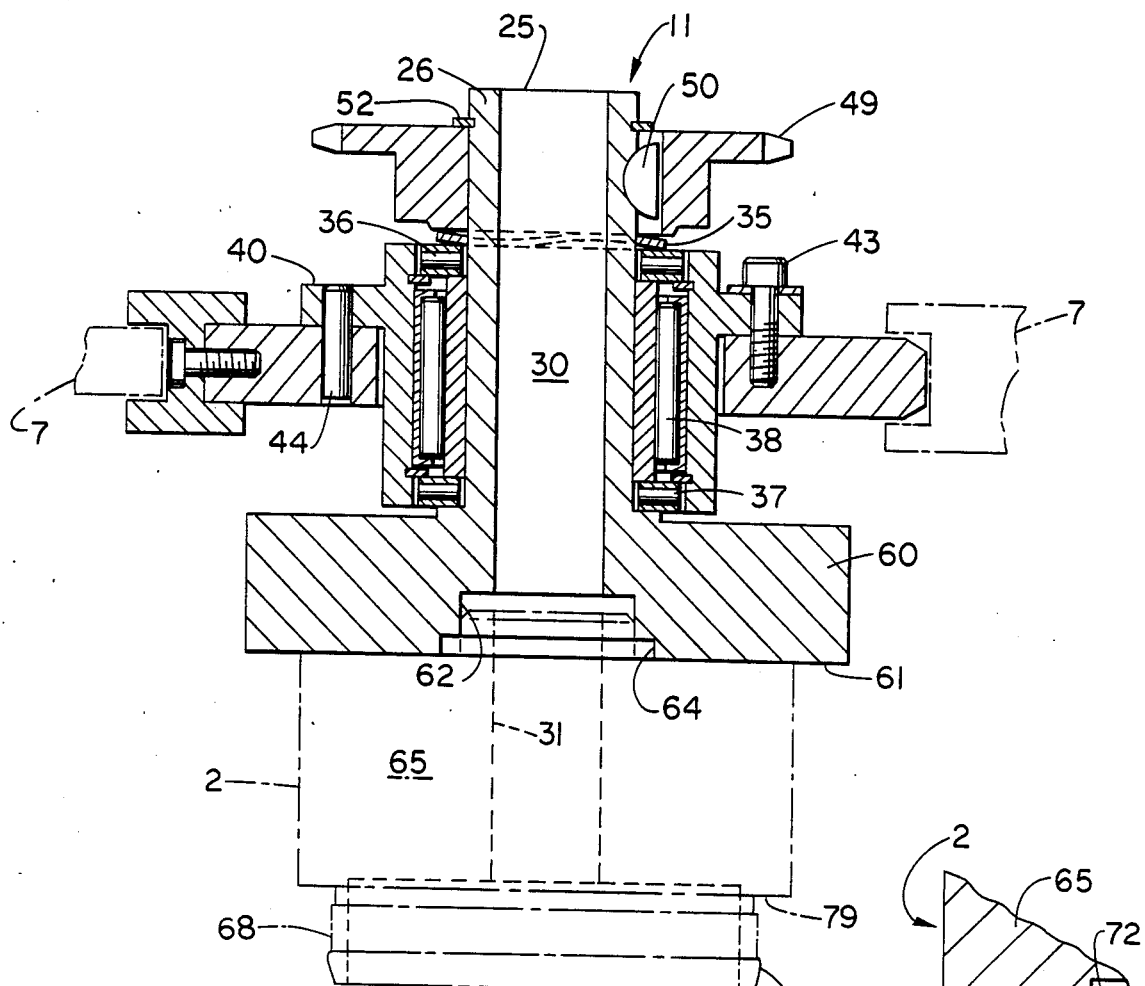
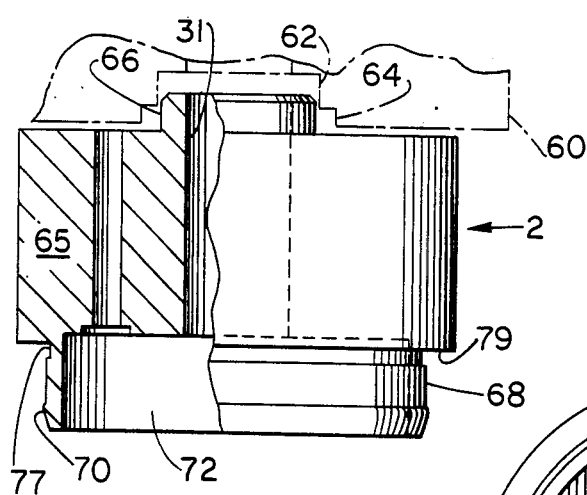
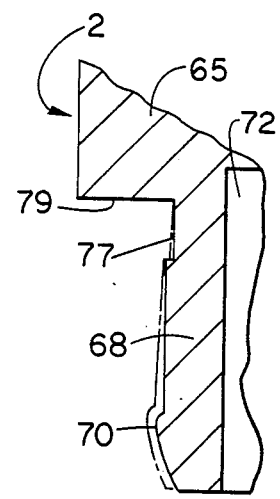
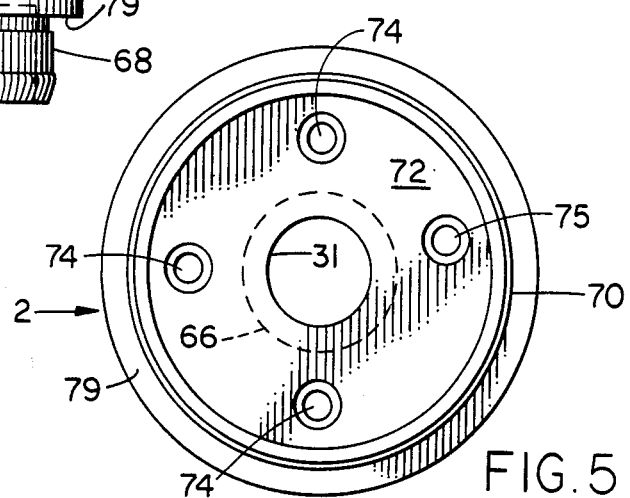

RESILIENT SKIRTED SPINDLE NOSE AND PALLET WITH RECIPROCATABLE SPINDLE COMBINED THEREWITH

This invention relates to an improved means for conveying one or more workpieces or preforms in blow molding machinery. One aspect of the invention relates to an improved resilient skirted spindle nose and pallet with reciprocatable spindle combined therewith, that is, an internal mandrel (nose) for conveying a thermoplastic preform at least through heating and blow molding stations in machinery of the reheat and blow type. Another aspect relates to an improved pallet incorporating such a spindle nose made of nylon.

In reheat and blow machinery, thermoplastic article preforms each having a formed portion and a formable portion are loaded into pallets in which they are conveyed through the machine, heated to a molecular orientation temperature while being rotated from their pallet support, and filled with an expansion fluid (usually compressed air) to biaxially stretch the formable portion to fill a mold cavity, thus to form a hollow article—usually a bottle or jar. The resulting finished product is then ejected. The formed portion is left unaltered and—if a bottle or other container—is suitable for receiving a closure, such as the aluminum cap commonly found on soft drink bottles. The pallets for conveying the preforms through the procedures just indicated travel through continuous paths from a preform load station through a heating means and blow molding means to an article or product eject station after which the empty pallets are returned to load station. The assignee of the present invention has disclosed pallets or article carrier means of the general sort for this purpose—and replaceable by the present invention—in recently issued U.S. Pat. No. 4,456,447. An article carrier is also disclosed by assignee's U.S. Pat. No. 4,382,760.

The preferred embodiment of a pallet of the present invention features a pallet base upon which are rotatably supported a pair of spindle noses. Each nose has a skirt that is sufficiently resilient to expand with the workpiece (preform and product or bottle) while under compressed air pressure for blowing, such expansion maintaining a seal between the finish (neck) of the workpiece and the skirt thus to eliminate leakage of compressed air. The spindles and pallet in general are also adapted to cooperate with a blow air means (called a stuffer) by establishing a face seal therewith, instead of employing the approach of a male-female, etc. type of seal. The face seal permits easier alignment and mechanical connection. However, the conveyance of a plurality of spindles on one pallet as here requires that each spindle be able to reciprocate a different amount when establishing a fluid flow path with the face seal. Also, the reciprocable spindle feature includes a biasing means such as a spring or the like in order to reset the spindle at suitable times, e.g. when the pallet moves everything onto the next operation which is usually ejection.

It therefore is an object of this invention to provide a pallet with an improved spindle nose mounted thereon.

One object of the present invention is to provide a spindle nose with a skirt flexible enough to expand in a leakproof manner with the preform under blowing pressure.

Other objects, advantages, and features of the present invention should become apparent from the following description and annexed drawings wherein:

FIG. 1 is a top view in a typical machine frame of a pallet with a pair of spindles according to the present invention;

FIG. 2 is a side view of the pallet of FIG. 1 illustrating an exemplars in section two sequential shapes of a workpiece while upon the spindle nose and typical preform and product cross section, with adjoining pallet 1A on the right;

FIG. 3 is a cross section along 3—3 of FIG. 1 illustrating the bearings supporting the nose from the pallet;

FIGS. 4 and 5 are respective enlarged partial cross-section and bottom (workpiece/preform end) of the spindle nose illustrating schematically the partial manner of mounting the spindle nose;

FIG. 6 is an enlarged partial section of the nose showing its sealing ring or ridge and in phantom its flexure outward when under air pressure.

FIGS. 1 and 2 illustrate a pallet assembly 1 complete with a pair of spindle noses (internal mandrels or chucks) 2. Phantom lines in these figures show outline of the mold and part of adjoining pallet 1A. Adjoining parts of the machine frame 7 in which the pallet may slide are not illustrated except in FIG. 3. Latch means 8A,8B connect them to adjacent pallet assemblies, e.g. 1 to 1A (FIG. 2 only). It is contemplated, for example, that the instant pallet assembly circulate through a flow path of a generally rectangular shape preferably past preform loading, reheating, blowing and ejecting work stations.

The preferred embodiment of the pallet assembly 1 and spindle nose exchangeable chuck as herein described has a pallet baseplate 10 in which are rotatably supported two spindles 11 which in turn support noses 2 are so constructed that they can reciprocate with respect to the baseplate 10. The contemplated operation of the machine has the pallet circulating in a horizontal plane, so the reciprocation is substantially vertical. The pallet assembly is intended to slide with reference to the machine frame 7 (FIG. 3) in which it is mounted. Tongue and groove type of bearing supports, are contemplated and here involve on one side and end a groove provided by injection molded plastic guide strips 14 arranged with four on one side and one on end. The other side and end of the rectangular baseplate have a tongue shape and engage grooves in like guide strips on adjoining baseplates 1A or the machine frame 7 as the case may be. Guides 14 are preferably each secured by a plurality of screws 16 to the edge of the baseplate. First and second latch means 8A,8B are provided, one at each end to connect in end-to-end fashion with a similarly constructed pallet assembly when circulating in the blow molding machine. The shape and function of the latch means is well-known and old in this particular art—see for example U.S. Pat. No. 4,185,812—but the two latches 8A,8B preferred and shown here have different dimensions and, although their notches match mechanically with an 8B or 8A, respectively, are not, interchangeable with each other.

FIGS. 2, 3, and 6 illustrate the relationship of the pallet assembly, preforms 18 carried therein, and blow station components. It is understood that the pallet assembly loaded with the preforms 18 has come to rest at the blow station, whereupon the blow molds 19 (FIG. 2) are clamped about the preform in known fashion and then the stuffers 20 which are air supply means for blowing are moved down to press against the top of the pallet assembly 1 in preparation for blowing. In this regard, and for the purposes of explanation, the pallet assembly is moved in the direction of the arrow of FIG. 2 and the blow molds 19 are moved normal to the plane of the paper of FIG. 2. A face seal 24 (FIG. 2) is established between the stuffer and the top of the spindle assembly by providing a flat surface on the bottom of stuffer and a flat surface 25 on the top of the spindle shaft 26. The blow molding machine by apparatus not pertinent here vertically reciprocates stuffer 20 causing it to descend, establish the face seal by engaging the corresponding top flat surface on the spindle, and then to continue descending sufficiently to provide a sealing force at 24 and also to compress the column of structure so that the support ring 28 on each preform bears against a matching portion of the blow mold 19.

It is predictable that there will be variations in preform dimensions and in the compressibility of the column of structure between the stuffer and where the preform support ring bears on the blow mold. In order to accommodate this while still maintaining a satisfactory face seal for the flow of compressed air through passageways 29 (stuffer), 30 (spindle), 31 (chuck), the present invention has structure to permit the reciprocation of the spindle relative to the pallet baseplate. The amount of reciprocation is not great—on the order of about 0.015 to about 0.050 inches. The structural features to permit this comprise the spindle assembly reset spring 35 (preferably an annular wave spring) and bearing arrangement which supports the rotatable portion of the spindle. The bearing assembly in turn comprises upper and lower thrust bearing assemblies 36,37 between which is mounted a needle bearing 38 having an inner race press fitted on the spindle shaft 26. The bearing assembly is in turn mounted in a flanged hub 40 which forms the bearing support and is in turn secured to the pallet baseplate by a plurality of cap screws 43 and is precisely located relative thereto by a roll pin 44. The roller members of the thrust bearings have radial clearances at both their inside and outside diameters. The thrust bearings are positioned in the bearing support by an internal snap ring.

At the top of the spindle shaft 26 is the seal surface 25, as already mentioned. Just below this is mounted the drive sprocket 49 or some other suitable drive means, preferably using a key 50 and a snap ring 52 to position the same nonrotatably on the shaft and also preventing axial shifting by the sprocket.

The bottom of spindle shaft 26 terminates in a spindle nose mounting base 60 which is nonrevolvably secured to shaft 26 or, preferably, made integral therewith. Air passage 30 continues on through shaft 26 and through spindle nose mounting base as illustrated in FIG. 3. The nose mounting base has a nose support surface 61 against which spindle nose 2 is held. Air passage 30 exits the spindle and base centrally of said support surface at a place where it joins with spindle nose air passage 31. Also, the mounting base has a locating recess 62 surrounding the place where passage 30 exits through the surface and coaxial therewith annular seal ring or gasket recess 64 circumscribes the conjunction the locating recess and support surfaces. Locating recess 62 preferably is circular and seal ring recess is preferably adapted to receive an O-ring.

The spindle nose 2 itself comprises in its preferred embodiment a one-piece or integral member molded, machined or otherwise formed from a single piece of plastic known as "nylon 66". It is preferably circular in shape (FIG. 5) and has a main body 65 from which protrudes on one side locating stud 66 which fits into and is shaped like locating recess 62. Extending down from the opposite side, usually the bottom, of the nose base is skirt 68 or flexible annular mandrel which sealably connects to a preform. This skirt is made so that it can expand under the pressure of blowing air by an amount sufficient to maintain the seal with the preform finish 69, or more exactly to maintain a seal with the inside surface of the preform finish. If the skirt does not have this resilience, whereby it can follow expansion under pressure of the preform finish and still maintain the seal, finish 69 will expand too much, create a gap with the skirt, whereupon the seal is lost, air leaks hence pressure drops, and the blowing becomes ineffectual or imperfect. This has happened where the nose has been solid (except for pass 31) instead of skirted. Efforts to correct this would require either excessive air pressure or supply. Other techniques in an attempt to remedy a leaks as from a solid or too rigid skirt require applying a tremendously increased vertical force on the finish of the preform in order to improve the face seal there—which has led to damage of preforms such as breaking ring 28 and so forth.

Spindle nose 2 in addition to having flexible skirt 68 has a sealing bulge 70 shaped thereon. In the past, on other kinds of pallets, an O-ring or the like has been used at this point. However, experience has shown that O-rings fail after a few cycles of operation and require replacement. Therefore, integral sealing bulge 70 preferably is provided.

FIG. 5 shows an interesting feature of the preferred embodiment. In the cavity 72 within skirt 68 the spindle nose body has bolt holes 74,75 completely through it whereby bolts or preferably cap screws are used to secure it to the spindle mounting base. However, one of the bolt holes 75 is off-set or eccentric so that spindle orientation can be achieved if a nonround preform body is to be blown. Spindle orientation is a feature heretofore known in machine tools to stop a tool spindle at a particular position each time.

Thus, a spindle nose according to the invention has a base with spindle orientation mounting (off-set mounting hole 75) in it, a centrally located air passage 31 which connects between the spindle air passage 30 and the inside of the preform, a flexible skirt 68 which expands under blowing pressure sufficiently to maintain seal with the inside of the preform finish, is preferably of one-piece construction and even more preferably is made from a low friction material such as "nylon 66". Furthermore, the expanding skirt has a sealing contour or bulge 70, the better to achieve a seal with the preform. The skirt also has a relief 77 or undercut where the skirt connects or first protrudes from surface 79 of body 65.

An example of skirt dimensions providing suitable flexibility is found in those for a spindle nose to be used for handling a preform and the resulting product with a 77 mm. finish. The inside diameter of the skirt at its bottom end is 2.750, the outside diameter of the skirt above the sealing ring must be from 2.818 to 2.822 inches, the maximum OD of the sealing ring must be from 2.830 to 2.834 inches and the depth of the skirt is about 0.66 inches from the preform face of the base to the bottom of the skirt.

Relief 77 is an undercut machined or otherwise formed all the way around the skirt where it joins the base. This relief enhances flexibility and also makes it easier to separate the workpiece from the spindle nose after blowing. This relief is approximately 0.12 inches along the axis and about 0.010 inches deep. For the 77 mm finish, offset screw hole 75 center is preferably 0.243 inches vertically above the horizontal centerline as seen in FIG. 5. This gives the requisite offset if needed for making a nonround product or handling nonround preforms or parisons.

A wide range of chuck sizes may be provided to accommodate a correspondingly wide range and variety of preforms. Illustrated in FIG. 2 is a preform having the contours of a typical 77 mm. thread outside diameter (OD) preform while on the right hand unit of FIG. 2 is illustrated a blown product having the shape of a 77 mm. thread finish jar of the kind used, e.g., for a peanut butter or mayonnaise jar.

Baseplate 10 may have a plurality of holes 81 therein to both reduce its weight and allow air flow during heating. Preferably, aluminum tooling plate comprises 10 and 81 are drilled.

The foregoing description should provide insight to the manner of operation. Ordinarily, the pallet assembly 1 is brought to a halt at the blow mold station as shown in FIG. 2 and stuffer 20 is brought down to establish seal 24. At this point spindle reset spring 35 is compressed to almost a flat position by an amount in the range from about 0.015 to about 0.050 inches as a consequence of pushing the spindle assembly including the chuck down relative to the pallet baseplate. This actually causes the spindle shaft to move relative to the bearing structure described above. And actually to move relative to the thrust bearings 36,37 and needle bearing 38.

Ordinarily, at the blow mold there is no rotation. Support ring 28 engages the molds 19 and air passes into preform 18 from the passageways 29,30,31 which are fluid tight at the face seals due to the force from stuffer 20 and the expansion of skirt.

At the end of the blowing operation, the stuffers are withdrawn vertically and the blow molds open. It will be recalled (e.g. right hand FIG. 2) that the formable parts of the respective preforms will have expanded to a much greater outer diameter than before the blowing procedure started. The withdraw upwardly of stuffers 20 permits reset springs 35 to return to their free height, e.g. as in FIG. 6 and appropriate mechanisms of the blow molding machine move pallet 1 out of blow mold 19 (preferably in the direction of FIG. 2 arrow 22) where the preform then is ejected. Thereafter, the pallet is moved through its circulating path and new preforms are eventually supplied and the entire cycle of heating, blowing and ejecting repeated.

When it is desired to change spindle noses, upon which the preforms are carried the entire nose 2 is removed by removing bolts 74,75. Another chuck is then supplied and reattached in correct alignment by inserting locator stud 66 in recess 62 and rotating until offset hole 75 aligns with its mate in the spindle mount. The procedure may be employed to replace a chuck which needs repair or to change the system over for processing different sized preforms. In normal operation, however, the present invention and in fact the blowing machine 7 in its entirely would likely be arranged to make one size of preform at a time even though it has the capability of making more than one size and shape if desired. Light weight is desirable to reduce inertia forces in use and the actual preferred weight range of the disclosed pallet with two spindle assemblies but no chuck runs. The guides 14 are preferably of injection molded nylon most preferably of a blend of nylon and polytetrafluoroethylene (Teflon brand) such as the blend El DuPont sells as Delrin AF-100-NC.

What is claimed is:

1. A spindle nose for use in manufacturing or blow molding hollow plastic products from a hollow workpiece having a finish the inside diameter of which is engaged by a portion of the spindle nose, said spindle nose comprising:
    a base; a locating stud extending from one side of said base; a flexible annular skirt extending from the other side of said base, said skirt being sufficiently resilient to maintain sealing engagement with the inside diameter of the workpiece finish during blow molding; and an air passage extending completely through said locating stud, base, and flexible skirt.

2. A spindle nose according to claim 1 having offset means for spindle orientation mounting to the bottom of a machine spindle on which said spindle nose is to be mounted.

3. A spindle nose according to claim 1 made out of a material which presents a low friction surface at those places where said spindle nose connects to said workpiece.

4. A spindle nose according to claim 1 comprising an integral sealing ring on the outside of said resilient skirt.

5. A spindle nose according to claim 1 where said resilient skirt has a relief portion where said resilient skirt joins said base.

6. A spindle nose according to claim 5 where said base has an annular surface surrounding and substantially normal to said relief portion.

7. A spindle nose according to claim 1 where said locating stud, base, and resilient skirt are coaxial and annular.

8. A spindle nose according to claim 1 wherein said resilient skirt surrounds a substantially large recess area within which are located said mounting bolt holes and spindle orientation means.

9. An improved pallet assembly for use in a blow molding machine that uses a blow fluid, said assembly having an exchangeable chuck and permitting relative axial motion between the spindle and the pallet baseplate, said assembly comprising:
    a generally rectangular pallet baseplate;
    a plurality of spindle assemblies extending through and mounted in the baseplate;
    each spindle assembly having bearing means, a hollow spindle shaft with a passage therethrough mounted in said bearing means for rotation and axial reciprocation relative to a shaft axis and said baseplate, a shaft base at the bottom of said shaft, a reset means to urge said shaft to its beginning position after lineal movement, and a locating and seal recess within said shaft base and surrounding the passage at bottom end of said spindle shaft; and
    a spindle nose mounted on said shaft base for use in manufacturing or blow molding hollow plastic products from a hollow workpiece having a finish the inside diameter of which is engaged by a portion of the spindle nose, which portion further comprises:
    a nose base; a locating stud extending from one side of said nose base into said locating recess; a flexible skirt extending from the other side of said nose base, said skirt being sufficiently resilient to maintain sealing engagement with the inside diameter of the workpiece finish during blow molding; and a second air passage connected to the first said passage and extending through said locating stud, nose base, and flexible skirt.

10. A pallet assembly according to claim 9 wherein said reset means includes a resilient biasing means for urging a spindle shaft drive arm toward said bearing means.

11. A pallet assembly according to claim 10 wherein said reset means comprises a wave spring.

12. A spindle nose in the pallet according to claim 9 having offset means for spindle orientation mounting to the shaft base at the bottom of the spindle assembly said spindle nose which it is mounted.

13. A spindle nose according to claim 9 made out of a material which presents a low friction surface at those places where said spindle nose connects to said workpiece.

14. A spindle nose according to claim 13 comprising an integral sealing ring on the outside of said resilient skirt.

15. A spindle nose according to claim 9 where said resilient skirt has a relief portion where said resilient skirt joins said base.

16. A spindle nose for use in blow molding hollow plastic products from a hollow preform having a finish the inside diameter of which is engaged by a portion of the spindle nose, said spindle nose comprising:

a base having a top side and a bottom side; a flexible annular skirt extending from the bottom side of said base, said skirt being sufficiently resilient to maintain sealing engagement with the inside diameter of the preform finish during blow molding; said base and skirt being formed of material which presents a low friction surface at those places where the nose connects to said workpiece; and an air passage extending completely through said base and skirt region.

17. A spindle nose according to claim 16 having on the top side of said base a means for locating said nose relative to a pallet.

18. A spindle nose according to claim 16 comprising an integral sealing ring on the outside of said resilient skirt.

19. A spindle nose according to claim 16 wherein said resilient skirt has a relief portion where said resilient skirt joins said base.

* * * * *